US011687769B2

(12) United States Patent
Tolpin et al.

(10) Patent No.: US 11,687,769 B2
(45) Date of Patent: Jun. 27, 2023

(54) ADVANCED TECHNIQUES FOR MACHINE LEARNING USING SAMPLE COMPARISONS

(71) Applicant: PayPal, Inc., San Jose, CA (US)

(72) Inventors: David Tolpin, Ashdod (IL); Benjamin Hillel Myara, Tel Aviv (IL); Michael Dymshits, Holit (IL)

(73) Assignee: PayPal, Inc., San Jose, CA (US)

( * ) Notice: Subject to any disclaimer, the term of this patent is extended or adjusted under 35 U.S.C. 154(b) by 1638 days.

(21) Appl. No.: 15/639,580

(22) Filed: Jun. 30, 2017

(65) Prior Publication Data

US 2019/0005408 A1    Jan. 3, 2019

(51) Int. Cl.
| | |
|---|---|
| *G06N 3/08* | (2023.01) |
| *G06N 20/00* | (2019.01) |
| *G06N 3/082* | (2023.01) |
| *G06N 3/045* | (2023.01) |
| *G06Q 30/06* | (2023.01) |
| *G06F 16/35* | (2019.01) |

(52) U.S. Cl.
CPC ............... *G06N 3/08* (2013.01); *G06F 16/35* (2019.01); *G06N 3/045* (2023.01); *G06N 3/082* (2013.01); *G06N 20/00* (2019.01); *G06Q 30/06* (2013.01)

(58) Field of Classification Search
CPC . G06N 20/00; G06N 3/08; G06N 3/04; G06F 17/30707; G06K 9/6269
USPC .......................................................... 706/20
See application file for complete search history.

(56) References Cited

U.S. PATENT DOCUMENTS

| | | | | |
|---|---|---|---|---|
| 2012/0226590 A1* | 9/2012 | Love | ...................... | G06Q 10/10 705/30 |
| 2015/0073981 A1* | 3/2015 | Adjaoute | ........... | G06Q 30/0225 705/39 |
| 2016/0019546 A1* | 1/2016 | Eisen | ...................... | G06F 21/44 705/44 |
| 2016/0203490 A1* | 7/2016 | Gupta | ................ | G06Q 20/4016 705/44 |
| 2017/0004487 A1* | 1/2017 | Hagen | ................... | G06F 16/215 |
| 2018/0109507 A1* | 4/2018 | Caldera | .................. | G06N 20/00 |

OTHER PUBLICATIONS

Lake et al.—"Human-level concept learning through probabilistic program induction"—2015—https://science.sciencemag.org/content/350/6266/1332/tab-pdf (Year: 2015).*
Bromley et al.—"Signature verification using a "Siamese" time delay neural network"—1994—https://papers.nips.cc/paper/1993/file/288cc0ff022877bd3df94bc9360b9c5d-Paper.pdf (Year: 1994).*

* cited by examiner

*Primary Examiner* — Viker A Lamardo
(74) *Attorney, Agent, or Firm* — Haynes & Boone, LLP

(57) ABSTRACT

Machine learning techniques can be used to train a classifier, in some embodiments, to accurately detect similarities between different records of user activity for a same user. When more recent data is received, newer data can be analyzed by selectively removing particular sub-groups of data to see if there is any particular data that accounts for a large difference (e.g. when run through a classifier that has been trained to produce similar results for known activity data from a same user). If a sub-group of data is identified as being significantly different from other user data, this may indicate an account breach. Advanced machine learning techniques described herein may be applicable to a variety of different environments.

20 Claims, 5 Drawing Sheets

| Label | Account ID | Country | Txn. Date | Txn. Amount | Recipient ID |
|---|---|---|---|---|---|
| Valid | 1234 | US | 1/1/2017 | 5.50 USD | 19876565 |
| Valid | 5678 | CA | 2/2/2016 | 320.00 CAD | 97765982 |
| Fraud | 7890 | IT | 12/12/2016 | 28.93 GBP | 654648 |
| Valid | 3214 | US | 2/2/2017 | 72348.00 JPY | 8798757 |

202　204　206　208　210　212

Records
200

FIG. 2A

| Label | Account ID | Country | Txn. Date | Txn. Amount | Recipient ID |
|---|---|---|---|---|---|
| Valid | 5789 | US | 5/16/2017 | 5.50 USD | 19876565 |
| Valid* | 5789 | US | 5/16/2017 | 320.00 USD | 97765982 |
| Valid | 5789 | US | 5/12/2017 | 28.93 USD | 654648 |
| Valid | 5789 | US | 5/10/2017 | 72348.00 JPY | 8798757 |
| Valid | 5789 | US | 5/9/2017 | 14.59 USD | 23523 45 |
| Valid | 5789 | US | 5/3/2017 | 220.00 USD | 0923948897 |
| Valid | 5789 | US | 4/30/2017 | 17.98 USD | 09827438 |
| Valid* | 5789 | US | 4/30/2017 | 85.99 USD | 89475903 |
| Valid | 5789 | US | 4/26/2017 | 5.89 USD | 98759834 |
| Valid | 5789 | US | 4/22/2017 | 5.89 USD | 98759834 |
| Valid* | 5789 | US | 4/20/2017 | 40.00 GBP | 654648 |
| Valid | 5789 | US | 4/15/2017 | 72.80 USD | 8798757 |

202 — Label
204 — Account ID
206 — Country
208 — Txn. Date
210 — Txn. Amount
212 — Recipient ID

*Denotes fraudulent access that might be presumed valid initially

Records 250

FIG. 2B

ADVANCED TECHNIQUES FOR MACHINE LEARNING USING SAMPLE COMPARISONS

TECHNICAL FIELD

This disclosure includes techniques relating to machine learning using sample dropout and sample comparisons with a trained classifier. These techniques are applicable to a number of environments including but not limited to account security.

BACKGROUND

Classification of data may require that a given piece of data (e.g., all or part of a particular record) is categorized into one of a number of categories. This process can be performed manually by a user who examines the data, in some instances. In other instances, specified rules might be used to help automate the classification process.

Machine learning offers another alternative, where data can be categorized based on a machine learning model. However, some machine learning approaches to categorization may suffer from an inability to accurately categorize data. Thus, in certain data sets, particularly relating to large numbers of users of a system and/or service, it may be difficult to appropriately categorize certain data. Inability to categorize data correctly and/or in a timely manner can impact system performance and cause inefficiency.

BRIEF DESCRIPTION OF THE DRAWINGS

FIG. 2A illustrates a block diagram of a set of data records corresponding to different unique users, according to some embodiments.

FIG. 2B illustrates a block diagram of a set of data records corresponding to a single user, according to some embodiments, in which certain data corresponds to unauthorized account use by a second party.

DETAILED DESCRIPTION

Figure 1:
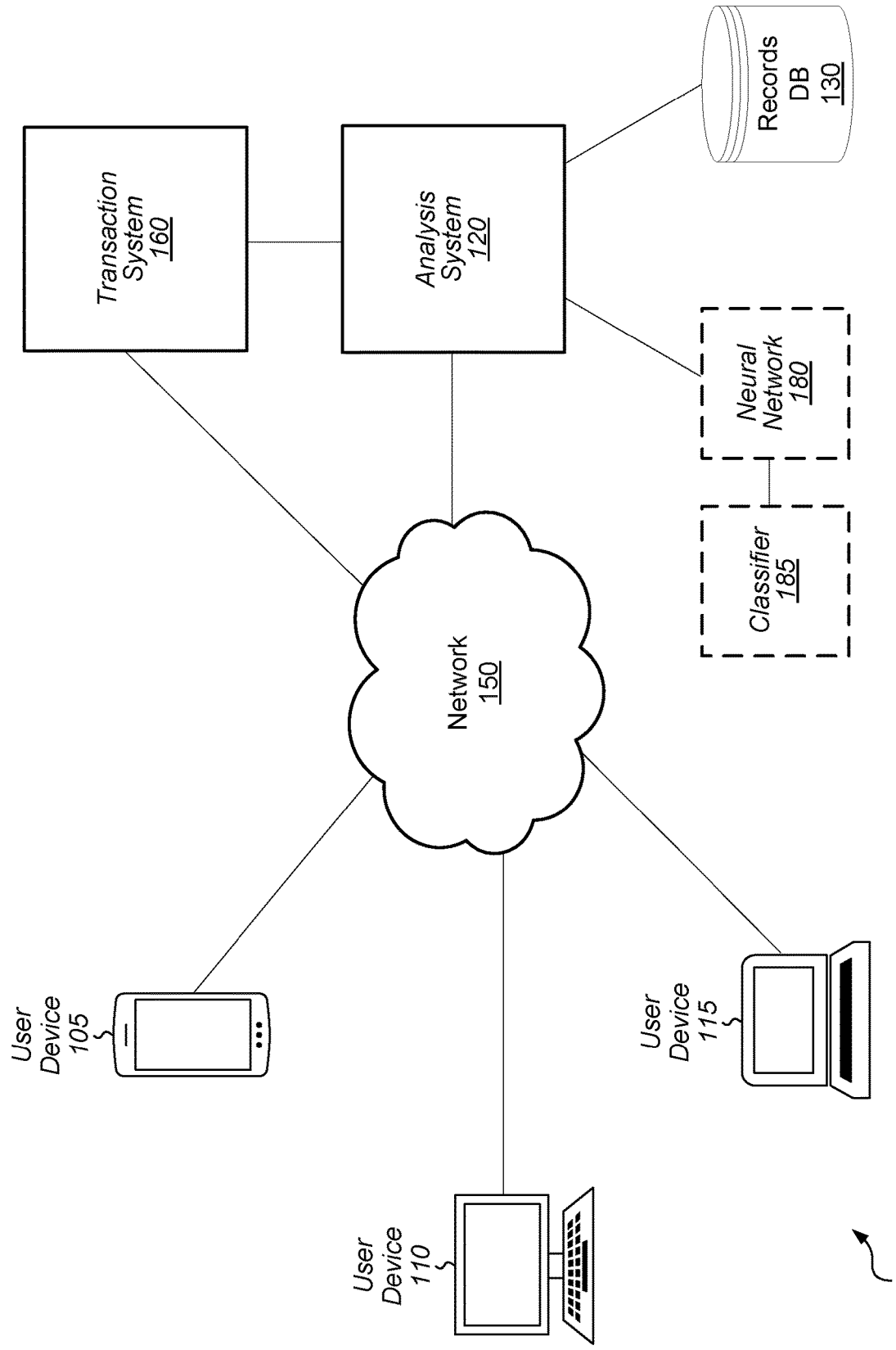
FIG. 1 illustrates a block diagram of a system that includes users devices, an analysis system, a transaction system, a network, a records database, a neural network, and a classifier according to some embodiments.

The present specification allows for the analysis of data and for improved data classification using advanced machine learning techniques. In particular, certain data corresponding to user activity, such as transaction logs, login information, or other activity data, may include a variety of information about actions taken by a user.

Classifying data into one of a number of categories can be useful in a variety of circumstances. In some instances, it may be particularly useful for an electronic payment transaction provider to be able to classify transactions as valid or fraudulent (or another category).

Machine learning techniques however, can be employed to provide better data classification, particularly with relation to whether a user account has been accessed by another party (who may have a different pattern of usage than the authorized user of the account). One method of determining whether an account has been compromised by an unauthorized user is examining recent data (e.g. a most recent 10 or 20 transactions) with historical data and performing a comparison. If the recent data and historical data are similar in terms of their features, it may be likely that all new activity has been performed by the authorized user.

However, user behavior can also drift over time. Thus, when performing automatic classification of user activity data (such as payment transaction logs), it may be necessary to allow some amount of deviation in user behavior without raising an alert. That is, some amount of tolerance is needed in various circumstances—otherwise, an overly sensitive system that raises an alert for any minor deviation in behavior could frustrate users.

A machine learning based classifier can be trained, with user activity data for a number of different users, to closely identify an differences of past user data with more recent user data. Thus, a classifier can be robustly trained to give a determination as to whether a batch of more recent user activity data is significantly different (or not) than past user data. However, when a user account is compromised, illegitimate activity such as unauthorized payment transactions may be somewhat disguised with a number of other legitimate user activities. Thus, when a user account has been compromised (e.g. from a stolen password, hacked laptop or mobile phone, etc.), it is not always easy to distinguish authorized activity from unauthorized activity.

It may be the case, however, that a particular subset of user activity is significantly different from other user activity—particularly when an account has been compromised. If a subset of data indicative of user by a second party can be isolated, a more reliable determination can be made as to whether a whole set of data may contain unauthorized activity.

To this end, machine learning techniques can be used to first train a classifier, in some embodiments, to accurately detect similarities between different records of user activity for a same user. When more recent data is received, the newer data can be analyzed by selectively removing particular sub-groups of data to see if there is any particular data that accounts for a large difference (e.g. when run through a classifier that has been trained to produce similar results for known activity data from a same user). If a sub-group of data is identified as being significantly different from other user data, this may indicate an account breach.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Turning to FIG. 1, a block diagram of a system 100 is shown. In this diagram, system 100 includes user devices 105, 110, 115, an analysis system 120, a transaction system 160, and a network 150. Also depicted are records DB (database) 130, neural network 180, and classifier 185. Note that other permutations of this figure are contemplated. E.g., certain connections are shown (e.g. data link connections) between different components. Thus in various embodiments, additional connections and/or components may exist that are not depicted. Further, components may be combined with one other and/or separated into one or more systems.

User devices 105, 110, and 115 may be any type of computing system. Thus, these devices can be a smartphone, laptop computer, desktop computer, tablet computer, etc. As discussed below, user devices such as 105, 110, and 115 may engage in various transactions using transaction system 160. Analysis system 120 may comprise one or more computing devices each having a processor and a memory, as may transaction system 160. Network 150 may comprise all or a portion of the Internet.

In various embodiments, analysis system 120 can take various operations related to training and/or using a classifier that allows analysis system 120 to determine whether a user account has been accessed by two or more people. Note that machine learning techniques described herein are not restricted to user account-related operations, and can be generalized and/or adapted to various settings.

Transaction system 160 may correspond to an electronic payment service such as that provided by PayPal™. Thus, transaction system 160 may have a variety of associated user accounts allowing users to make payments electronically and to receive payments electronically. A user account may have a variety of associated funding mechanisms (e.g. a linked bank account, a credit card, etc.) and may also maintain a currency balance in the electronic payment account. A number of possible different funding sources can be used to provide a source of funds (credit, checking, balance, etc.). User devices 105, 110, and 115 can be used to access electronic payment accounts such as those provided by PayPal™.

Records database 130 includes records of various actions taken by users of transaction system 160. These records can include any number of details, such as any information related to a transaction or to an action taken by a user on a web page or an application installed on a computing device (e.g., the PayPal app on a smartphone).

Neural network 180 is shown as being connected to analysis system 120. In various embodiments, a neural network is one or more executable programs and one or more associated data structures that be used to implement machine learning techniques, as will be understood by one of skill in the art. Classifier 185 may be trained by neural network 180, and can be used to determine whether a user account (e.g. of transaction system 160) has been used by two different persons in various embodiments. Thus, neural network 180 and classifier 185 can be used to detect if an account has been accessed by an unauthorized person (e.g. a hacker) in various instances. Neural network 180 and classifier 185 may use records database 130 to make such calculations, as will be described.

Turning to FIG. 2A, a block diagram is shown of one embodiment of a set of records 200. These records may be contained in records database 130, for example.

As shown, field 202 includes a label for a transaction. In this example, the labels include "valid" or "fraudulent" as shown on various rows. In some embodiments, additional labels could be used, such as "unknown", "presumed valid", etc. A valid transaction may be any transaction that has not been flagged by analysis system 120 as fraudulent or reported by a user or merchant as fraudulent, in some embodiments. Field 204 includes a unique account ID for a user. Field 206 includes a country code for the user (e.g., US=United States, CA=Canada, etc.). Fields 208 and 210 represent a transaction date and a transaction amount (which may be specified in a particular currency such as US Dollars, Great Britain Pounds, etc.). Field 212 includes a recipient ID, which could be an ID for a merchant who is receiving funds in the transaction, or the account of a personal consumer in a peer to peer transaction, for example.

Many additional pieces of information may be present in records 200 and in records database 130 in various embodiments. An email address associated with an account (e.g. which can be used by users to direct an electronic payment to an account using only that account's associated email address) can be listed. Home address, phone number, and any number of other personal details can be listed. Further, note that the records the embodiment of FIG. 2A explicitly relate to transactions that may be performed by an electronic payment system. In various embodiments, however, records can also include information on other actions, such as actions taken relative to a website or an application installed on a device such as the PayPal application on a smartphone. Record information can therefore include location and/or IP address of where a user has logged into an account; unsuccessful login attempts (including IP address etc.); time of day and/or date of week for any event mentioned herein; funding sources added or removed and accompanying details (e.g. adding a bank account to allow currency to be added to or withdrawn from a user account), etc.

Turning to FIG. 2B, a block diagram of one example of a set of records 250 belonging to a single user is shown. Labels for the fields in this diagram, for purposes of simplicity, are the same as those shown in FIG. 2A. As noted herein, however, many different pieces of information may be used as part of the techniques described, and are not limited to those illustrated.

FIG. 2B illustrates in part the records of a user account that has been compromised by another user (e.g. a hacker). The user records shown indicate that a user with the unique account identifier of 5789 has participated in a number of activities over a period of time. These activities, as shown, indicate various electronic payment transactions that have been made from the user account. (Note that while the transactions illustrated are all outbound payments, receipt of inbound payments may also be used as activities when determining if a user account has been accessed by another party).

In this example, all transactions by user ID 5789 are assumed to be valid, e.g., an electronic payment transaction processor such as PayPal may have at least initially allowed each of the transactions to proceed. In other words, a transaction that is not initially denied may be labeled as a "valid" transaction, in various instances, unless and until information indicating that the transaction is invalid is reported (such as a credit card chargeback, a user fraud complaint, etc.).

As shown, however, three transactions with an asterisk (*) are not legitimate transactions engaged in by the owner of account 5789. These denoted transactions were instead made by an unauthorized second party. However, transaction system 160 may not have been aware that the transactions were not legitimate at the time they were made, and therefore allowed the transactions to go through. The transactions may not be reported as illegitimate until a later date, potentially causing financial loss to a payment processor, paying user, receiving party (e.g. merchant), and/or another party.

Thus, a subset of records of one or more activities engaged in by a user may actually be records of a second user that has been able to access the original user's account. Detecting that these records (e.g. of transactions) are not from the original user, however, can be difficult. When viewed as a whole series of records, for example, fraudulent transactions by a second party who has accessed a first party's account may blend in with other legitimate transactions, and may not be uncovered as fraudulent until a much later date (if ever). It might be obvious that a $7,500 transaction for a user who has never transacted above $150 is likely to be fraudulent, for example, but for a user who often transacts in amounts up to $500, it may not be immediately apparent even to a skilled human eye that one or more transactions in the $100-$300 range are likely fraudulent. Techniques described herein, however, allow for better detection of fraudulent transactions, particularly when the subset of unauthorized transactions can be isolated from the legitimate transactions by means of a trained classifier in various instances.

Figure 3:
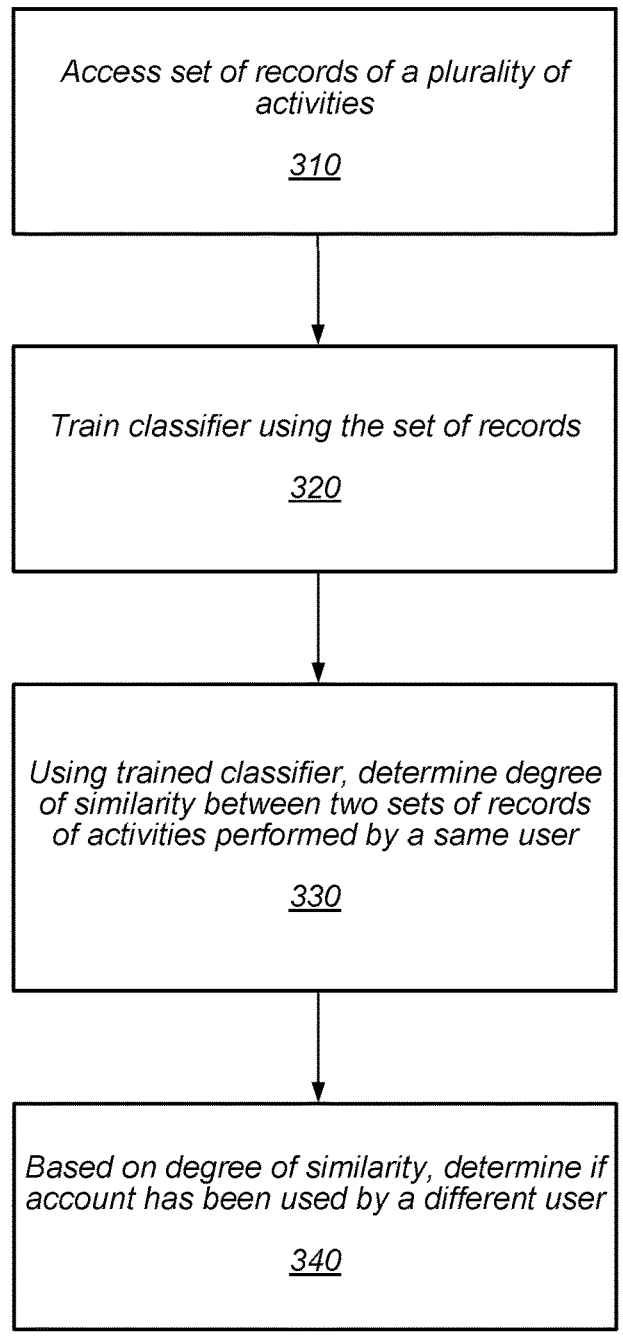
FIG. 3 illustrates a flow diagram of a method that relates to using a trained classifier to determine whether an account of a user appears to have been used by a different user according to some embodiments.

Turning now to FIG. 3, a flow diagram is shown illustrating one embodiment of a method 300 that relates to using a trained classifier to determine whether an account of a user appears to have been used by a different user—and therefore, allowing a determination to be made as to whether one or more transactions are fraudulent. This determination can be made at an earlier period in time than might otherwise happen when a fraudulent transaction is performed. For example, when an electronic payment transaction uses a credit card as a funding source, a consumer might be entitled to dispute the transaction to her issuing bank within 30 days of a statement being issued (which might be many weeks after the fraudulent transaction actually occurred). If a transaction is identified as fraudulent (e.g. via machine learning techniques described herein), then damage can be mitigated and corrective steps can be taken at an earlier time, possibly limiting financial loss for a consumer, a business, and/or an electronic payment processor.

Operations described relative to FIG. 3 may be performed, in various embodiments, by any suitable computer system and/or combination of computer systems, including analysis system 120 and/or transaction system 160. For convenience and ease of explanation, however, operations described below will simply be discussed relative to analysis system 120. Further, various elements of operations discussed below may be modified, omitted, and/or used in a different manner or different order than that indicated. Thus, in some embodiments, analysis system 120 may perform one or more aspects described below, while transaction system 160 (or another system) might perform one or more other aspects.

In operation 310, analysis system 120 accesses a set of records of a plurality of activities performed by a plurality of users of an electronic service provider (ESP), in one embodiment. This operation can include accessing records database 130 to get records of transactions engaged in by users of an electronic payment transaction service (e.g. transaction history for users of PayPal™, Venmo™, etc.).

In operation 320, in one embodiment, analysis system 120 trains a classifier for a neural network using the set of records. The classifier (e.g. classifier 185) may be trained to help determine, based on various transaction and/or other information, whether a user account has been accessed by a different user than the account holder (which may correspond to a hostile account takeover (ATO) scenario). In some embodiments, the classifier is trained to minimize outcome differences between sample records of the set of records that belong to a same user.

Minimizing outcome differences, as discussed in the above paragraph, can refer to a scenario in which the classifier is trained so that when input with two different sets of user record data that belong to the same user (e.g. a set of transactions from an earlier time period and a set of transactions from a later time period), the classifier will generate two results that are relatively similar. In a single dimension, for example, results from the classifier might be numbers on a [0.00, 1.00] scale. In this simplified scenario, an ideal classifier might always return a "0.00" when input any two data sets belonging to a same user and return a "1.00" when data sets from different users are input. In larger data environments, achieving an ideal classifier may be impossible. The training process for the classifier might involve adjusting the classifier such that, however, for the largest number of users possible the classifier would return the smallest differences possible (e.g. less than 0.10 on a zero to one scale) while seeking to maximize differences between different users (e.g. striving for greater than 0.85 on a zero to one scale). Note that in various embodiments, a classifier can be used to produce multi-dimensional outputs when run on data sets, e.g., a vector or a matrix as opposed to a single number. In these embodiments, various techniques to measure distance between vectors or matrices can be used, as will occur to one with skill in the art, to minimize differences produced by the classifier when the classifier is run on two samples from a same user. That is, the classifier can be trained in a variety of ways.

In some embodiments, a neural network used to train a classifier is a Siamese network. In such a network, two copies of the network may be used such that different data (e.g., from a same user, or from different users) is fed into each copy of the network and evaluated via the classifier (e.g. classifier 185, which may be a data construct and/or associated program instructions). The network (which may contain classifier 185) can then be tweaked e.g. by randomly adjusting neurons and/or portions of the classifier and then the same data can be input again with the alterations (e.g., using a dropout technique). Many iterations can be performed using the same data but with different variations on the classifier to see which version of the classifier may work best for that particular data. This process can be iterated using other data sets (e.g. different data from a same first user, data from the first user and data from a different second user, etc.) until the classifier is trained. Training data used for this purpose may be from thousands or even millions of different users, in various embodiments. After running multiple iterations (e.g. with different versions of a classifier in the neural network) using multiple different data sets, a particular version or versions(s) of the classifier may be selected following the training. This version of the classifier may then be used in a production environment, in various embodiments, to help detect whether user accounts have been used by two different persons, which can indicate a security breach.

In operation 330, analysis system 120 uses a trained classifier to determine a degree of similarity between a newer set of records of a plurality of activities performed by a particular user of an electronic service provider and an older set of records of a plurality of activities performed by the particular user, in one embodiment. This operation can therefore include examining a set of newer transactions (e.g. a window of the last 15 or 20 transactions engaged in by a user) and comparing them to older transactions (which may be a group of transactions that are assumed to be valid and non-fraudulent). By running this data through classifier 185, the classifier can produce an output (e.g. a single number, vector, matrix, or one of a list of possible states such as low risk, medium risk, high risk) that indicates whether a user's account may have been compromised by another party.

Determining the degree of similarity between newer records and older records includes, in various embodiments, performing an innovative technique that involves the subtraction of records for comparison purposes. If an electronic payment account (or other type of account) is only being used by a single authorized user, classifier 185 may show that there is a high degree of consistency between older user activity and newer user activity. However, user behavior can vary over time—for example, a user might get a new job paying 20% more money, and start making more transactions. Likewise, a user of a computer system (e.g. a programmer, an administrator, an ordinary corporate user, etc.) might end one project and begin another, or move time zones and start working different hours, etc.

Thus, the fact that user behavior has shifted over time is not always a strong indicator that a user's account has been compromised by a second party. However, if an account is compromised, there may essentially be two different subsets of user activity data contained in logs for the account: (1) activity by an authorized user; and (2) activity by an intruder. Simply looking at the account activity data as a whole (e.g. and comparing it to past data) may not easily reveal the presence of a second user on the account, however, as it is possible that activity by the second user could simply be mistaken for ordinary variation in activity by an authorized user.

By subtracting certain account activity data and making comparisons, however, a better determination can be made as to whether an account has been compromised, in various embodiments. This process may work as follows.

Consider a window of recent user activity such as a last 10, 15, or 20 transactions (these numbers may vary by embodiment and may be smaller or larger without limitation). In a window of 20 recent transactions, it may be the case that 2 of these transactions were made by an unauthorized user (e.g. a hacker who gained access to a legitimate user's account). By making selective comparisons using classifier 185, however, it can be determined if a particular subset of the newer records is indicative of account use by a second party in various embodiments.

A window of 20 recent transactions can be compared to past data (e.g. via classifier 185) to see if the recent transactions are generally in line with the user's past behavior. However, ordinary behavior deviations may render the results unclear (e.g. it cannot be easily distinguished whether one or more of the 20 recent transactions were by an unauthorized party).

By isolating different sub-groups of the last 20 (for example) transactions, however, the present techniques can determine with a higher likelihood whether some of these transactions might be fraudulent. Consider a situation where out of 20 past transactions, 3 are fraudulent. When comparing the whole group of 20 past transactions with user history, a similarity of 0.15 (in a single dimension, for purposes of illustration) might be discovered. Such a variation might be low enough, however, that the few fraudulent transactions in the 20 transaction window cannot be easily determined as being fraudulent.

If the 3 fraudulent transactions are removed from the 20 transaction window, however, leaving the 17 legitimate transactions, it may by the case that the 17 legitimate transactions have a similarity of 0.01 (e.g., extremely similar). In this case, the 3 other transactions would account for nearly the entire difference between prior history and recent activity. Such a discrepancy would indicate a much higher likelihood of account takeover (ATO).

In other words, by removing a selected subgroup of records (e.g. of transaction activity) from a larger group of transactions, the remaining transactions may have a greater (or lesser) degree of similarity to historical data. However, it may be necessary to try a number of different combinations in order to see which combination of records accounts for a greatest difference when comparing a set of first data to a set of second data through a classifier to determine if the data correspond to behavior by a same user.

Thus, in some embodiments, for a given 15 or 20 transaction window (for example), every mathematical combination of possible data sub-group removal may be tried and run through classifier 185 to compare to prior data for a same user. This may result in thousands or possible millions of combinations being tried, where analysis system 120 attempts to determine if there is any particular group of transactions (e.g. 2 or 3 or some other number of transactions) that account for a large difference relative to the output of classifier 185. Efficiency when using a brute-force approach to the combinations can be achieved in some instances by using parallel GPU calculations and pre-computed matrices that are indicative of all the possible combinations. In other embodiments, however, not every single combination may be tried—there may be limits imposed (e.g., with a window of 20 transactions, do not try remove more than 10 of the data records—on the theory, for example, that if more than 50% of the user transactions are fraudulent then a different security measure may have already flagged the user account). Additionally, Markov Chain Monte Carlo (MCMC) or other mathematical techniques can be used to try to use only certain combinations without exhaustively trying all combinations.

Still referring to operation 330, in some embodiments, once a number of data substitutions have been performed on a first set of data to, it can be determined which subgroup(s) causes the greatest apparent difference when comparing the first set of data to another set of data. In other words, a subgroup of one or more transactions can be isolated from a data set as being the "least similar" to other past transactions performed by a user, in various embodiments.

Method 300 can therefore involve creating an edited set of newer records by selectively removing one or more particular pieces of information in a newer set of records and comparing the edited set of records to an older set of records. Method 300 can also include creating a plurality of edited sets of newer records by selectively removing difference pieces of information in the newer set of records and performing a plurality of comparisons of the edited sets of newer records to the older set of records to determine if an account appears to have been used by a different user. The disclosure in the preceding paragraphs can be used to achieve these techniques in various embodiments. For example, edited sets of records can be created by selectively removing certain data from a set of record. Note that in some instances, the edited sets of records may be transient (e.g., classifier 185 may be run on data representing an edited set of records but the edited set of records is not permanently retained).

In operation 340, in some embodiments, analysis system 120 determines whether an account of a particular user appears to have been used by a different user based on a degree of similarity indicated between a newer set of records and an older set of records (e.g., from operation 330). This degree of similarity, as noted above, can be based on finding a subgroup of one or more pieces of data that account for a maximum difference between the newer set of records and the older set (e.g., a subgroup of data indicative of the maximum difference, or a near maximum difference, can be determined).

Once the subgroup of data—e.g. specific transactions—is isolated from a larger group of data, a further analysis can then be made. If the difference indicated by the subgroup of data is large enough, then it can be inferred that the data is significant (e.g. it indicates a compromised user account).

Additional factors beyond machine learning-based similarity analysis can also be used to determine if an account may have been compromised. If a subgroup of transactions rises above a threshold difference (E.g. the equivalent of 0.20 on a zero to one scale, or some other value), further scrutiny and/or heuristics can be applied by analysis system 120. For example, transactions in the subgroup might be flagged as fraudulent only if they come from an IP address, location, and/or country that the user has not been associated with prior to the last 30 or 60 days. Transaction information can also be used, e.g., perhaps a transaction will only be flagged as potential fraud if (in addition to the similarity differences to past behavior) the transaction is at least 75%, 150%, or 250% or more than the user's average transaction value (other financial based metrics can also be used).

Once one or more transactions are believed to have been made by an unauthorized second party, the transactions may be labeled as "fraud" or "suspected fraud" in various embodiments. These labels can be used in training other data and machine learning models, which can be beneficial in an environment where definitively knowing whether a transaction was fraudulent can take many weeks (due to the time delays that can be associated with credit card chargebacks, for example). User accounts believed to have been compromised can also have a transaction be halted (e.g. by analysis system 120 informing transaction system 160). Similarly, a user account may also be suspended, logged out from all devices (e.g. a device with PayPal OneTouch in use) and/or have the user required to provide additional secondary authentication (answering security questions via phone call, responding to a letter mailed to the user's registered mailing address, etc.). Payment refunds can also occur (e.g. a user account may be credited with funds lost in a fraudulent transaction).

Computer-Readable Medium

Figure 4:
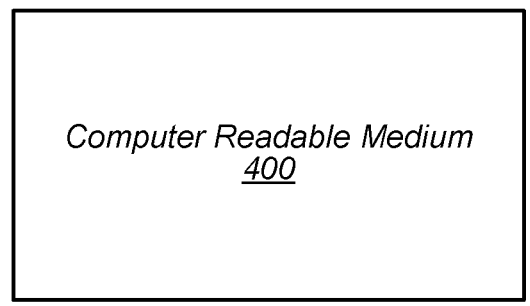
FIG. 4 is a block diagram of a computer readable medium, according to some embodiments.

Turning to FIG. 4, a block diagram of one embodiment of a computer-readable medium 400 is shown. This computer-readable medium may store instructions corresponding to the operations of FIG. 3 and/or any techniques described herein. Thus, in one embodiment, instructions corresponding to analysis system 120 may be stored on computer-readable medium 400.

Note that more generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript. Note that as used herein, the term "computer-readable medium" refers to a non-transitory computer readable medium.

Computer System

Figure 5:
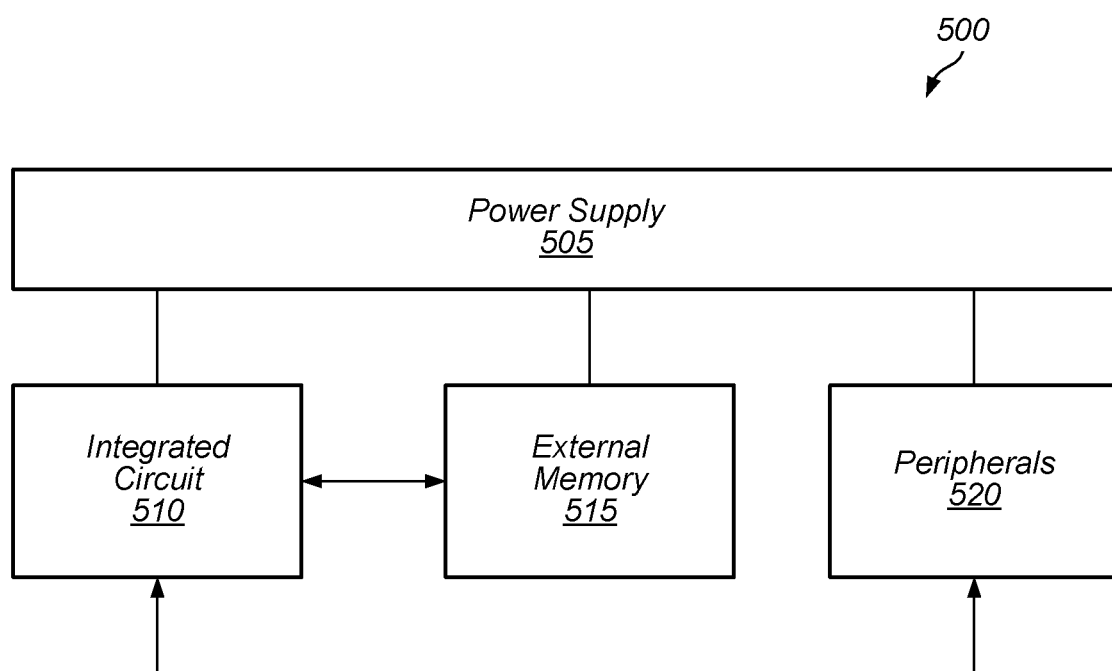
FIG. 5 is a block diagram of a system, according to some embodiments.

In FIG. 5, one embodiment of a computer system 500 is illustrated. Various embodiments of this system may be image processing system 110, transaction system 160, or any other computer system as discussed above and herein.

In the illustrated embodiment, system 500 includes at least one instance of an integrated circuit (processor) 510 coupled to an external memory 515. The external memory 515 may form a main memory subsystem in one embodiment. The integrated circuit 510 is coupled to one or more peripherals 520 and the external memory 515. A power supply 505 is also provided which supplies one or more supply voltages to the integrated circuit 510 as well as one or more supply voltages to the memory 515 and/or the peripherals 520. In some embodiments, more than one instance of the integrated circuit 510 may be included (and more than one external memory 515 may be included as well).

The memory 515 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 510 in a chip-on-chip configuration, a package-on-package configuration, or a multi-chip module configuration.

The peripherals 520 may include any desired circuitry, depending on the type of system 500. For example, in one embodiment, the system 500 may be a mobile device (e.g. personal digital assistant (PDA), smart phone, etc.) and the peripherals 520 may include devices for various types of wireless communication, such as wife, Bluetooth, cellular, global positioning system, etc. Peripherals 520 may include one or more network access cards. The peripherals 520 may also include additional storage, including RAM storage, solid state storage, or disk storage. The peripherals 520 may include user interface devices such as a display screen, including touch display screens or multitouch display screens, keyboard or other input devices, microphones, speakers, etc. In other embodiments, the system 500 may be any type of computing system (e.g. desktop personal computer, server, laptop, workstation, net top etc.). Peripherals 520 may thus include any networking or communication devices necessary to interface two computer systems.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   training, by one or more hardware processors, a classifier comprising a neural network using records associated with transactions conducted by different users of an electronic service provider (ESP), wherein the classifier is trained to minimize outcome differences between samples from the records associated with a same user;
   accessing, by the one or more hardware processors, a first set of records associated with a first plurality of transactions conducted through a particular user account with the ESP during a first time period;
   generating, by the one or more hardware processors, a plurality of modified record sets based on selectively removing different subsets of records from the first set of records;
   determining, by the one or more hardware processors using the trained classifier, a plurality of outcomes for the plurality of modified record sets;
   determining, by the one or more hardware processors, differences between each outcome in the plurality of outcomes and a particular outcome corresponding to a second set of records associated with a second plurality of transactions conducted through the particular user account during a second time period; and
   determining whether the particular user account appears to have been used by different users based on the differences.

2. The method of claim 1, wherein the classifier is further trained to maximize outcome differences between records of transactions associated with different users.

3. The method of claim 1, wherein the neural network is a Siamese neural network comprising a first neural network and a second neural network.

4. The method of claim 3, wherein the training the classifier comprises performing multiple iterations of (i) feeding different samples from the records to the first neural network and second neural network and (ii) adjusting a transformation used by the classifier.

5. The method of claim 1, further comprising:
   receiving transaction information indicating that an authorized user of the particular user account has engaged in an electronic payment transaction using the ESP, wherein the determining whether the particular user account appears to have been used by a different user is further based on the transaction information.

6. The method of claim 1, wherein the first plurality of transactions includes payment transactions and log-in transactions.

7. The method of claim 1, wherein the first time period is more recent than the second time period.

8. The method of claim 1, wherein the generating the plurality of modified record sets comprises:
   generating a first modified record set based on removing a first subset of records from the first set of records; and
   generating a second modified record set based on removing a second subset of records from the second set of records.

9. The method of claim 1, further comprising denying a transaction request associated with the particular user account based on a determination that the particular user account appears to have been used by different users.

10. A non-transitory computer-readable medium having stored thereon machine-readable instructions executable to cause a computer system to perform operations comprising:
    training a classifier comprising a neural network using records associated with transactions conducted by different users of an electronic service provider (ESP), wherein the classifier is trained to minimize outcome differences between samples of the records associated with a same user;
    accessing a first set of records associated with a first plurality of transactions conducted through a particular user account with the ESP during a first time period;
    generating a plurality of modified record sets based on selectively removing different subsets of records from the first set of records;
    calculating, using the trained classifier and for each modified record set in the plurality of modified record set, a degree of similarity between the modified record set and a second set of records associated with a second plurality of transactions conducted through the particular user account during a second time period; and
    determining whether the particular user account appears to have been used by an unauthorized user based on a deviation between a first degree of similarity calculated for a first modified record set in the plurality of modified record set and a second degree of similarity calculated for a second modified record set in the plurality of modified record set.

11. The non-transitory computer-readable medium of claim 10, wherein the operations further comprise suspending the particular user account based on determining that the particular user account appears to have been used by an unauthorized user.

12. The non-transitory computer-readable medium of claim 10, wherein the calculating the degree of similarity comprises performing a comparison between the modified record set and the second set of records.

13. The non-transitory computer-readable medium of claim 10, wherein the first time period is more recent than the second time period.

14. The non-transitory computer-readable medium of claim 10, wherein the generating the plurality of modified record sets comprises:
    generating the first modified record set based on removing a first subset of record from the first set of records; and
    generating the second modified record set based on removing a second subset of record from the first set of records.

15. The non-transitory computer-readable medium of claim 10, wherein the classifier is further trained to maximize outcome differences between second samples from the records associated with transactions conducted by different users.

16. The non-transitory computer-readable medium of claim 10, wherein the operations further comprise crediting a refund to the particular user account for a transaction associated with the first modified record set based on determining that the particular user account appears to have been used by an unauthorized user.

17. A system, comprising:
a non-transitory memory; and
one or more hardware processors coupled to the non-transitory memory and configured to read instructions from the non-transitory memory to cause the system to perform operations comprising:
accessing a classifier comprising a neural network using records associated with different users, wherein the classifier is trained to minimize outcome differences between samples from the records that are associated with a same user;
accessing a first set of records associated with a first plurality of transactions conducted through a particular user account with an electronic service provider (ESP) during a first time period;
generating a plurality of modified record sets based on selectively removing different subsets of records from the first set of records;
determining, using the classifier and for each modified record set in the plurality of modified record sets, a degree of similarity between the modified record set and a second set of records associated with a second plurality of transactions conducted through the particular user account during a second time period; and
determining whether the particular user account appears to have been used by different users based on a deviation between a first degree of similarity determined for a first modified record set in the plurality of modified record sets and a second degree of similarity determined for a second modified record set in the plurality of modified record sets.

18. The system of claim 17, wherein the operations further comprise:
receiving transaction information indicating that an authorized user of the particular user account has engaged in an electronic payment transaction using the ESP, wherein the determining whether the particular user account appears to have been used by different users is further based on the transaction information.

19. The system of claim 17, wherein the ESP comprises an electronic payments processor, and wherein the first plurality of transactions includes payment transactions and log-in events to a service of the ESP.

20. The system of claim 17, wherein the first time period is more recent than the second time period.

\* \* \* \* \*